(12) United States Patent
Watanabe

(10) Patent No.: US 11,383,642 B2
(45) Date of Patent: Jul. 12, 2022

(54) DISPLAY CONTROL APPARATUS

(71) Applicant: AISIN CORPORATION, Kariya (JP)

(72) Inventor: Kazuya Watanabe, Anjo (JP)

(73) Assignee: AISIN CORPORATION, Kariya (JP)

( * ) Notice: Subject to any disclaimer, the term of this patent is extended or adjusted under 35 U.S.C. 154(b) by 267 days.

(21) Appl. No.: 16/632,930

(22) PCT Filed: Feb. 21, 2018

(86) PCT No.: PCT/JP2018/006260
§ 371 (c)(1),
(2) Date: Jan. 22, 2020

(87) PCT Pub. No.: WO2019/026320
PCT Pub. Date: Feb. 7, 2019

(65) Prior Publication Data
US 2020/0238907 A1    Jul. 30, 2020

(30) Foreign Application Priority Data

Aug. 3, 2017 (JP) .............................. JP2017-150671

(51) Int. Cl.
*B60R 1/00* (2022.01)
*G06T 1/00* (2006.01)
(Continued)

(52) U.S. Cl.
CPC .............. *B60R 1/00* (2013.01); *G06T 1/0007* (2013.01); *G06T 17/00* (2013.01); *G06V 20/58* (2022.01);
(Continued)

(58) Field of Classification Search
CPC ................ B60R 1/00; B60R 2300/105; B60R 2300/802; B60R 25/10; B60R 25/305;
(Continued)

(56) References Cited

U.S. PATENT DOCUMENTS 7,161,616 B1 *   1/2007   Okamoto .............. G06T 3/4038
                                                      348/148
7,741,961 B1 *   6/2010   Rafii ...................... B60Q 9/005
                                                      340/435
(Continued)

FOREIGN PATENT DOCUMENTS

EP       2 733 937 A1     5/2014
EP       2733937 A1 *     5/2014  ........... B60R 25/305
(Continued)

OTHER PUBLICATIONS

Communication dated Jun. 8, 2020 from European Patent Office in EP Application No. 18842006.1.

*Primary Examiner* — Abderrahim Merouan
(74) *Attorney, Agent, or Firm* — Sughrue Mion, PLLC

(57) ABSTRACT

A display control apparatus includes a hardware processor configured to: acquire a first image and a second image, the first image being obtained at a first height position of a vehicle to capture an image of a circumstance in a first direction, the second image being obtained at a second height position to capture an image of a circumstance in a second direction; acquire a three-dimensional virtual projection plane to which the first and images are projectable, the three-dimensional virtual projection plane including a side surface; correct, in the height direction, on a basis of a difference between the first and height positions, the correction of the projection position being performed to align contents of the first and second images with each other; and generate a three-dimensional composite image including the first and second images that have been aligned with each other in the height direction by the correction.

3 Claims, 7 Drawing Sheets

(51) Int. Cl.
*G06T 17/00* (2006.01)
*G06V 20/58* (2022.01)

(52) U.S. Cl.
CPC ... *B60R 2300/105* (2013.01); *B60R 2300/802* (2013.01); *G06T 2207/30252* (2013.01); *G06T 2215/16* (2013.01)

(58) Field of Classification Search
CPC ... G06K 9/00805; G06T 1/0007; G06T 17/00; G06T 2207/30252; G06T 2215/16; G06T 3/4038; G08B 13/19663; G08B 13/19608; G08B 13/19654; G08B 13/19647; H04N 7/181; H04N 7/18
See application file for complete search history.

(56) References Cited

U.S. PATENT DOCUMENTS

| | | | |
|---|---|---|---|
| 8,854,463 B2 * | 10/2014 | Imamura | B60Q 9/005 348/148 |
| 2009/0122140 A1 * | 5/2009 | Imamura | B60Q 9/005 348/148 |
| 2015/0109446 A1 | 4/2015 | Takano | |
| 2016/0350894 A1 * | 12/2016 | Kosaki | H04N 7/181 |
| 2017/0096106 A1 | 4/2017 | Higuchi et al. | |

FOREIGN PATENT DOCUMENTS

| | | |
|---|---|---|
| JP | 5648746 B2 | 1/2015 |
| JP | 2016-225865 A | 12/2016 |
| WO | 2015/194501 A1 | 12/2015 |

* cited by examiner

DISPLAY CONTROL APPARATUS

CROSS-REFERENCE TO RELATED APPLICATIONS

This application is national stage application of International Application No. PCT/JP2018/006260, filed Feb. 21, 2018, which designates the United States, incorporated herein by reference, and which claims the benefit of priority from Japanese Patent Application No. 2017-150671, filed Aug. 3, 2017, the entire contents of which are incorporated herein by reference.

TECHNICAL FIELD

Embodiments of the present invention relate to a display control apparatus.

BACKGROUND ART

Conventionally, an overhead image generation device has been suggested (for example, see Patent Document 1). The conventional overhead image generation device is configured to: capture images of the periphery of a vehicle by a plurality of image capture units mounted on a vehicle; perform image composition of the captured images to generate a three-dimensional composite overhead image; and display the overhead image on a display device inside the vehicle, thereby enabling a driver to recognize the circumstance around the vehicle.

This overhead image generation device solves a deviation of the composite image in a height direction that is caused by a difference in installation height (height from the ground) of the image capture units that perform capture in individual directions (front, rear, left, and right of the vehicle). Specifically, by changing the shape of part of the overhead images (three-dimensional space models) in the height direction to align their horizontal lines, the deviation, which may appear along the horizontal line in part of the displayed composite overhead image, is solved.

CITATION LIST

Patent Literature

Patent Document 1: Japanese Patent Application Laid-open No. 2016-225865

SUMMARY OF INVENTION

Problem to be Solved by the Invention

However, in the conventional technique, the position of the horizontal line in the image to be projected is aligned by changing a shape of part of the three-dimensional space model in the height direction. As a result, a problem may arise such that when the shape of an upper end part of the composite overhead image becomes uneven and such image is displayed on the display device, the shape of an edge part of the display image becomes unnatural and thus the unnatural image causes the deterioration in merchantability.

In view of the above, an object of the present invention is to provide a display control apparatus that is able to reduce the display deviation of the image content in the height direction without causing the shape of the edge part of the three-dimensional composite image or the like to become unnatural.

Means for Solving Problem

A display control apparatus of an embodiment includes a memory and a hardware processor coupled to the memory. The hardware processor is configured to: acquire a first image and a second image, the first image being obtained from a first image capture device that is mounted at a first height position of a vehicle to capture an image of a circumstance in a first direction of a periphery of the vehicle, the second image being obtained from a second image capture device that is mounted at a second height position differing from the first height position to capture an image of a circumstance in a second direction differing from the first direction; acquire a three-dimensional virtual projection plane to which the first image and the second image are projectable, the three-dimensional virtual projection plane including at least a side surface that rises in a height direction from a ground contact surface of the vehicle; correct, in the height direction, a projection position of at least one of the first image and the second image to be projected to the virtual projection plane on a basis of a difference between the first height position and the second height position, the correction of the projection position being performed to align content of the first image and content of the second image with each other; and generate a three-dimensional composite image including the first image and the second image that have been aligned with each other in the height direction by the correction. According to this configuration, for example, when there is a difference between the first height position of the first image capture unit and the second height position of the second image capture unit, the content (the projection position) of the image to be projected to the virtual projection plane is corrected on the basis of the difference between the height positions. In this case, the shape of the virtual projection plane is not changed. Thus, the shape of the outer edge part and the like of the displayed three-dimensional composite image is not changed, and the display deviation of the image content in the height direction can be reduced without deterioration in merchantability of the display image.

The hardware processor in the display control apparatus of the embodiment may perform the correction of the projection position on a basis of a height ratio between the first height position and the second height position. According to this configuration, for example, the display deviation caused by the difference between the first height position of the first image capture unit and the second height position of the second image capture unit can be corrected more suitably.

The display control apparatus of the embodiment may further include a position detection device configured to be capable of detecting a position of an object existing around the vehicle, and the hardware processor may acquire the virtual projection plane including the side surface that is provided at a position corresponding to the position of the object. According to this configuration, the side surface of the virtual projection plane is formed at the position where the detected object, for example another vehicle, exists. Thus, the shape (or size) of the object, to which the driver should pay attention, can be displayed more realistically, so that the deviation in the height direction (deviation of the horizontal line) is reduced. As a result, the visibility, the image quality, the merchantability, and the like can be enhanced further.

DESCRIPTION OF EMBODIMENTS

Exemplary embodiments of the present invention are hereinafter disclosed. The structure of the embodiments described below and the operation, results, and effects based on the structure are mere examples. The present invention can be implemented by other structure than the structures disclosed in the embodiments below, and at least one of various effects and side effects obtained based on the fundamental structures can be obtained.

In the present embodiment, a vehicle 1 incorporating a display control apparatus (display control system) may be, for example, an automobile including an internal-combustion engine (not illustrated) as a driving source, that is, an internal-combustion engine automobile, or an automobile including an electric motor (not illustrated) as a driving source, that is, an electric automobile or a fuel cell automobile. Alternatively, the vehicle 1 may be a hybrid automobile including both as the driving source, or an automobile including another driving source. The vehicle 1 may incorporate various transmissions or various devices necessary to drive the internal-combustion engine or the electric motor, for example incorporate a system, components, and the like. In one example of the driving methods, the vehicle 1 may be a four-wheel driving vehicle in which the driving force is transmitted to all four wheels 3 so that the four wheels are entirely used as the driving wheels. The method, the number, and the layout of the device regarding the driving of the wheels 3 can be variously set. The driving method is not limited to the four-wheel driving method and may be a front-wheel driving method or a rear-wheel driving method.

Figure 1:
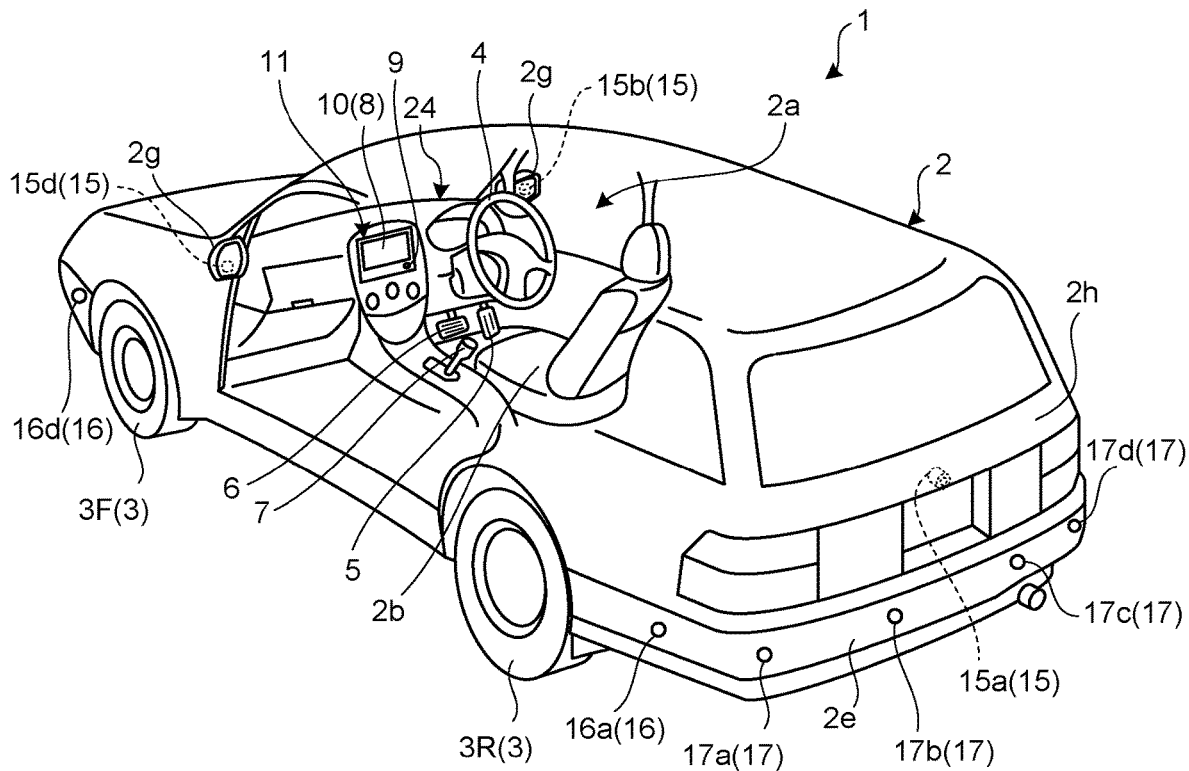
FIG. 1 is a perspective view illustrating one example in which part of a cabin of a vehicle including a display control apparatus according to one embodiment is transparent.

As illustrated in FIG. 1, a vehicle body 2 includes a cabin 2a in which an occupant (not illustrated) gets in. In the cabin 2a, a steering unit 4, an acceleration operation unit 5, a braking operation unit 6, a transmission operation unit 7, and the like are provided to face a seat 2b of a driver corresponding to one occupant. One example of the steering unit 4 is a steering wheel that protrudes from a dashboard 24, and one example of the acceleration operation unit 5 is an accelerator pedal positioned at the driver' feet. One example of the braking operation unit 6 is a brake pedal disposed at the driver's feet, and one example of the transmission operation unit 7 is a shift lever that protrudes from a center console. Note that the steering unit 4, the acceleration operation unit 5, the braking operation unit 6, the transmission operation unit 7, and the like are not limited to the aforementioned units.

In the cabin 2a, a display device 8 and a sound output device 9 are provided. One example of the display device 8 is an LCD (liquid crystal display) or an OELD (organic electroluminescent display). One example of the sound output device 9 is a speaker. The display device 8 is covered with, for example, a transparent operation input unit 10 such as a touch panel. The occupant is able to see an image displayed on a display screen of the display device 8 through the operation input unit 10. In addition, the occupant (driver, for example) is able to execute the operation input through an operation of touching, pushing, or moving in the operation input unit 10 with his finger or hand at a position corresponding to the image displayed on the display screen of the display device 8. The display device 8, the sound output device 9, the operation input unit 10, and the like are provided to, for example, a monitor device 11 that is positioned at a central part of the dashboard 24 in a vehicle width direction, that is, a left-right direction. The monitor device 11 may include an operation input unit (not illustrated) such as a switch, a dial, a joystick, or a pushbutton. In addition, a sound output device (not illustrated) may be provided at another position in the cabin 2a different from the position of the monitor device 11, and both the sound output device 9 of the monitor device 11 and the other sound output device is able to output the sound. Note that the monitor device 11 may also serve as a navigation system or an audio system, for example.

Figure 2:
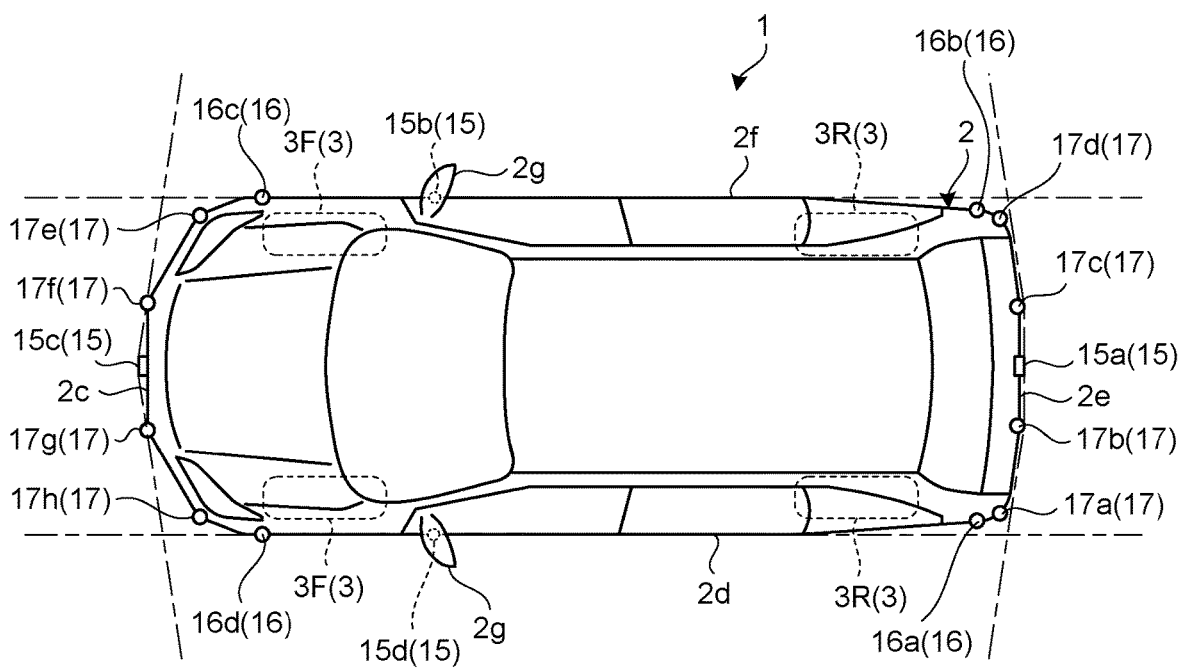
FIG. 2 is a plan view (overhead view) illustrating one example of the vehicle including a display control apparatus according to one embodiment.
Figure 3:
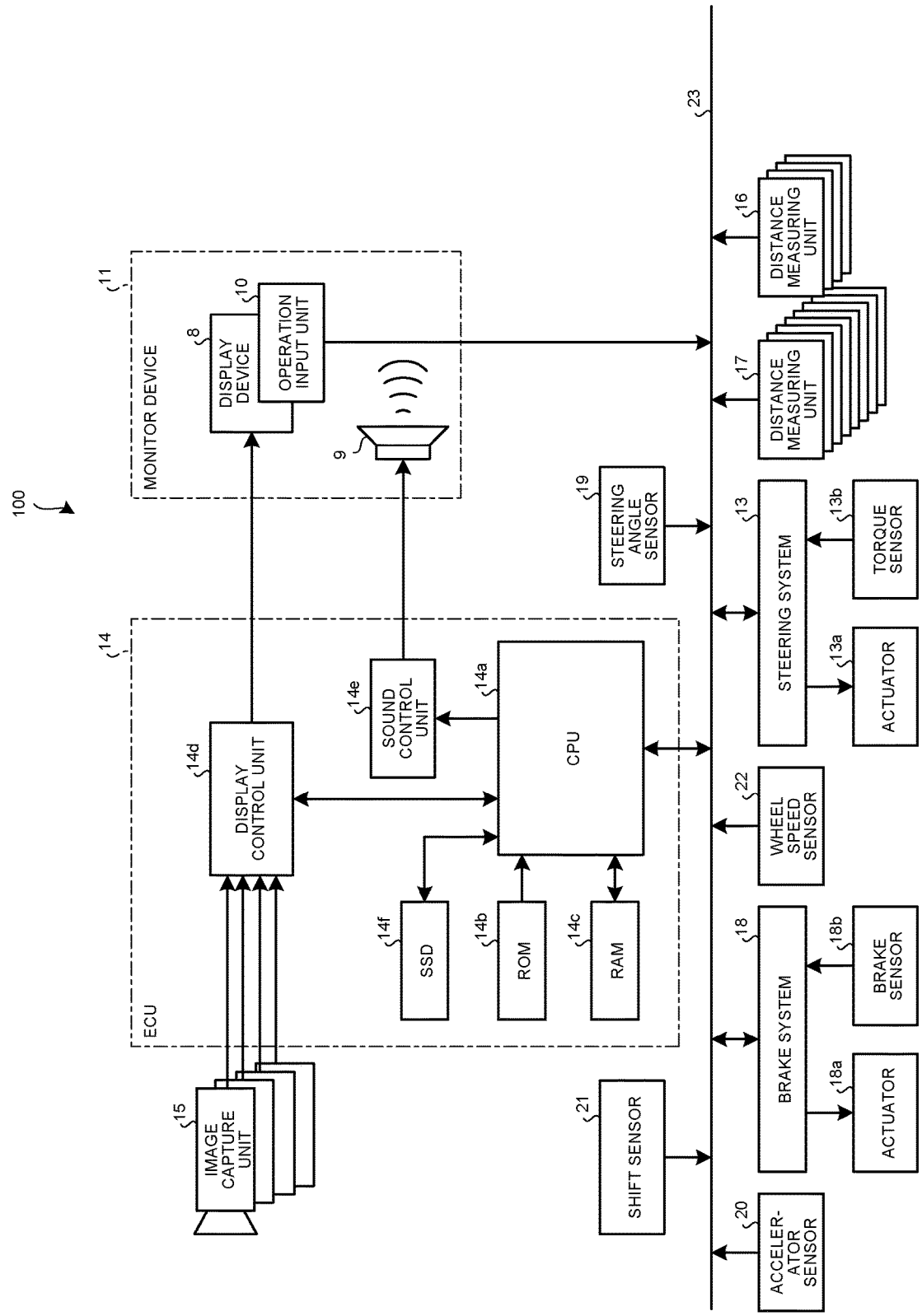
FIG. 3 is a block diagram illustrating one example of a structure of a display control system including the display control apparatus according to one embodiment.

Moreover, as illustrated in FIG. 1 and FIG. 2, the vehicle 1 is, for example, a four-wheeled automobile including left and right front wheels 3F and left and right rear wheels 3R. These four wheels 3 may be steerably configured. As illustrated in FIG. 3, the vehicle 1 includes a steering system 13 that steers at least two of the wheels 3. The steering system 13 includes an actuator 13a and a torque sensor 13b. The steering system 13 is electrically controlled by an ECU 14 (electronic control unit) so as to operate the actuator 13a. The steering system 13 is, for example, an electric power steering system or an SBW (steer by wire) system. The steering system 13 supplements the steering power by adding the torque, namely, assist torque to the steering unit 4 through the actuator 13a, and steers one or more of the wheels 3 through the actuator 13a. In this case, the actuator 13a may steer either one wheel 3 or plural wheels 3. In addition, the torque sensor 13b detects the torque that the driver applies to the steering unit 4, for example.

As illustrated in FIG. 2, the vehicle body 2 includes, for example, four image capture units 15a to 15d as a plurality of image capture units 15. Each image capture unit 15 is, for example, a digital camera that incorporates an image capture element such as a CCD (Charge Coupled Device) or a CIS (CMOS image sensor). Each image capture unit 15 is able to output moving picture data (captured image data) at a predetermined frame rate. The image capture units 15 each include a wide-angle lens or a fisheye lens and can photograph in the range of 140° to 220° in a horizontal direction. The optical axis of each image capture unit 15 may be set obliquely downward. Thus, each image capture unit 15 sequentially photographs the external environment around the vehicle 1 including a road surface where the vehicle 1 is able to move, or including objects (obstacles such as rock, tree, person, bicycle, and other vehicle), and outputs the result as captured image data.

The image capture unit 15a is positioned at, for example, an end part 2e on a rear side of the vehicle body 2, and is mounted at a wall part below a rear window of a door 2h in the rear hatch. The image capture unit 15b is positioned at, for example, an end part 2f on the right side of the vehicle body 2, and is mounted to a door mirror 2g on the right side. The image capture unit 15c is positioned at, for example, a front side of the vehicle body 2, that is, an end part 2c on the front side in the front-rear direction of the vehicle, and is mounted to a front bumper or a front grill. The image capture unit 15d is positioned at, for example, an end part 2d on the left side of the vehicle body 2, and is mounted to the door mirror 2g on the left side.

As illustrated in FIG. 3, in a display control system 100 (the display control apparatus), the ECU 14, the monitor device 11, the steering system 13, and the like and moreover, a brake system 18, a steering angle sensor 19, an accelerator sensor 20, a shift sensor 21, a wheel speed sensor 22, and the like are electrically connected over an in-vehicle network 23 being an electric communication line. The in-vehicle network 23 is constructed as a CAN (controller area network), for example. The ECU 14 can control the steering system 13, the brake system 18, and the like by transmitting a control signal over the in-vehicle network 23. Moreover, the ECU 14 can receive the detection results from the torque sensor 13b, a brake sensor 18b, the steering angle sensor 19, the accelerator sensor 20, the shift sensor 21, and the wheel speed sensor 22, and the operation signal from the operation input unit 10 and the like through the in-vehicle network 23.

As illustrated in FIG. 1 and FIG. 2, the vehicle body 2 includes, as a plurality of distance measuring units 16 and 17, four distance measuring units 16a to 16d and eight distance measuring units 17a to 17h are provided. The distance measuring units 16 and 17 are, for example, sonars that emit ultrasonic waves and receive reflective waves thereof. The sonar is also referred to as a sonar sensor or an ultrasonic wave detector. The ECU 14 can detect the presence or absence of the object, such as an obstacle around the vehicle 1, and can measure the distance (position) to the object on the basis of the detection results from the distance measuring units 16 and 17. Therefore, the distance measuring units 16 and 17 each function as a position detection unit that detects the position of the object existing around the vehicle 1. While the distance measuring unit 17 may be used for detecting the object that is relatively close to the vehicle 1, the distance measuring unit 16 may be used for detecting the object that is farther than the object that can be measured by the distance measuring unit 17. In addition, while the distance measuring unit 17 may be used for detecting the object in front of or behind the vehicle 1, the distance measuring unit 16 may be used for detecting the object beside the vehicle 1.

The ECU 14 includes, for example, a CPU 14a (central processing unit), a ROM 14b (read only memory), a RAM 14c (random access memory), a display control unit 14d, a sound control unit 14e, an SSD 14f (solid state drive, flash memory), and the like. The CPU 14a reads out a program stored (installed) in a nonvolatile storage device, such as the ROM 14b, and executes calculation processing in accordance with the program. The CPU 14a performs image processing relative to images to be displayed on the display device 8, for example. The CPU 14a performs the image processing and the calculation processing on the image data captured by the image capture unit 15 and thereby generates a three-dimensional peripheral image (for example, an overhead image). The CPU 14a is able to change the viewpoint for the peripheral image to be generated. In addition, the CPU 14a is able to detect whether or not an object to which the driver should pay attention exists around the vehicle 1 (for example, another vehicle, a wall, a pedestrian, and other obstacles), and able to change the display mode of the peripheral image on the basis of the position of the detected object. In addition, the CPU 14a is able to perform processing to notify the user (driver or occupant) of the presence of the object on the basis of the detected object.

The RAM 14c temporarily stores various pieces of data that are used for the calculation by the CPU 14a. In the calculation processing by the ECU 14, the display control unit 14d mainly performs composition of the image data to be displayed on the display device 8. In the calculation processing in the ECU 14, the sound control unit 14e mainly performs the processing of the sound data to be output from the sound output device 9. The SSD 14f is a rewritable nonvolatile storage unit that is able to store data even when the power of the ECU 14 is turned off. The CPU 14a, the ROM 14b, the RAM 14c, and the like may be integrated within a single package. The ECU 14 may include a logic circuit or a logical calculation processor, such as a DSP (digital signal processor), instead of the CPU 14a. An HDD (hard disk drive) may be provided in place of the SSD 14f, and the SSD 14f and the HDD may be provided separate from the ECU 14.

The brake system 18 is, for example, an ABS (anti-lock brake system) that prevents the lock of the brake, a skid prevention device (ESC (electronic stability control)) for preventing the skid of the vehicle 1 in cornering, an electric brake system that reinforces the braking force (assists the braking), or a BBW (brake by wire). The brake system 18 applies the braking force to the wheel 3 or the vehicle 1 through an actuator 18a. The brake system 18 is able to perform various kinds of control by detecting the symptom of the lock of the brake, the racing of the wheel 3, the skid, or the like on the basis of the difference in revolutions of the left and right wheels 3. The brake sensor 18b is, for example, a sensor that detects the position of a movable part of the braking operation unit 6.

The steering angle sensor 19 is, for example, a sensor that detects the amount of steering of the steering unit 4 being a steering wheel. The ECU 14 executes various kinds of control after acquiring the amount of the driver's steering of the steering unit 4, the amount of steering of each wheel 3 in the automated steering, and the like from the steering angle sensor 19. The accelerator sensor 20 is, for example, a sensor that detects the position of a movable part of the acceleration operation unit 5. The shift sensor 21 is, for example, a sensor that detects the position of a movable part of the transmission operation unit 7. The wheel speed sensor 22 is a sensor that detects the amount of revolutions of the wheel 3 or the number of revolutions of the wheel 3 per unit time. The wheel speed sensor 22 outputs the number of wheel speed pulses representing the detected number of revolutions as a sensor value. The ECU 14 calculates the amount of movement of the vehicle 1 on the basis of the sensor value acquired from the wheel speed sensor 22 and performs various kinds of control.

Note that the aforementioned structure, arrangement, electric connection mode, and the like of the sensors and actuators are mere examples and can be variously set (changed).

Figure 4:
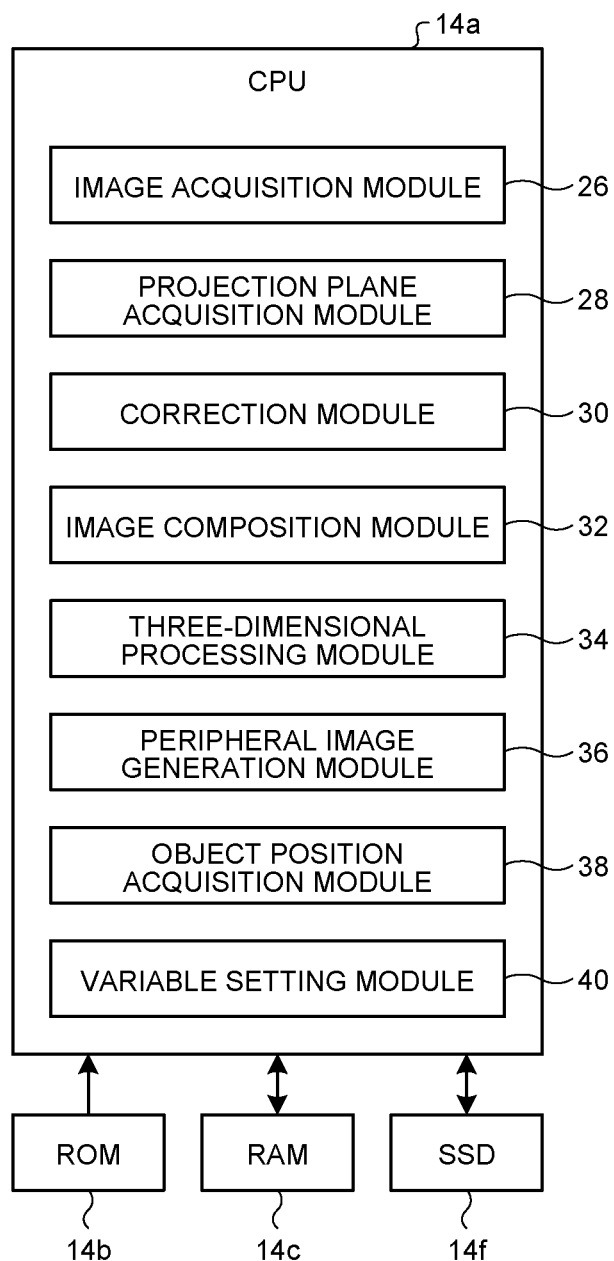
FIG. 4 is an exemplary block diagram of a structure of a CPU in the display control apparatus according to one embodiment.

As described above, the CPU 14a included in the ECU 14 displays the image of the environment around the vehicle 1 on the basis of the image data captured by the image capture unit 15 in a three-dimensional overhead mode, for example. In order to implement this function, the CPU 14a includes various modules illustrated in FIG. 4. The CPU 14a includes, for example, an image acquisition module 26, a projection plane acquisition module 28, a correction module 30, an image composition module 32, a three-dimensional processing module 34, a peripheral image generation module 36, an object position acquisition module 38, a variable-setting module 40, and the like. Those modules can be implemented by reading out a program installed and stored in a storage device, such as the ROM 14b, and executing the readout program.

Figure 5:
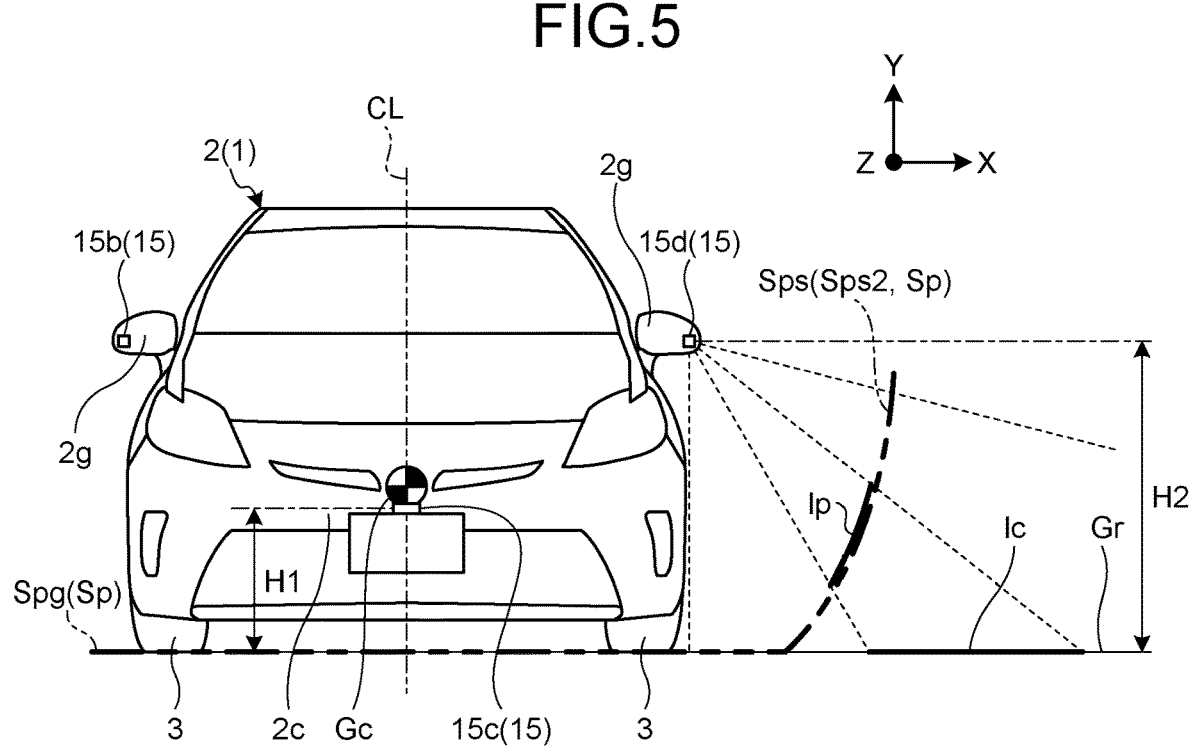
FIG. 5 is an exemplary and schematic explanatory view in which a captured image is projected to a virtual projection plane in the display control system according to one embodiment.

The image acquisition module 26 acquires information necessary to display the periphery of the vehicle 1. For example, the image acquisition module 26 acquires a plurality of pieces of captured image data from the image capture units 15 that capture the images of the periphery of the vehicle 1. In the present embodiment, the image capture units 15 are mounted at different height positions depending on mounting positions at the vehicle body 2 (vehicle 1). As illustrated in FIG. 1 and FIG. 5, the image capture unit 15b and the image capture unit 15d are fixed to the door mirrors 2g, for example. On the other hand, as illustrated in FIG. 5, the image capture unit 15c is fixed at the end part 2c of the vehicle body 2 and at a position lower than the door mirror 2g, such as at the front grill. In the present embodiment, the image capture unit 15c is also referred to as a first image capture unit that is mounted at a first height position (a first height H1) of the vehicle 1 to capture the image of the circumstance of the periphery of the vehicle 1 in a first direction (front). The captured image data from the first image capture unit (the image capture unit 15c) is referred to as first captured image data. In addition, the image capture unit 15b or the image capture unit 15d is mounted at a second height position (a second height H2) that is different from the first height position (the first height H1). The image capture unit 15b or the image capture unit 15d is also referred to as a second image capture unit that captures a second image representing the circumstance in a second direction (mainly left side or right side) where the second image can be joined, in the horizontal direction, to the first image that is based on the first captured image data. The captured image data from the second image capture unit (the image capture unit 15b or the image capture unit 15d) is also referred to as second captured image data.

Figure 6:
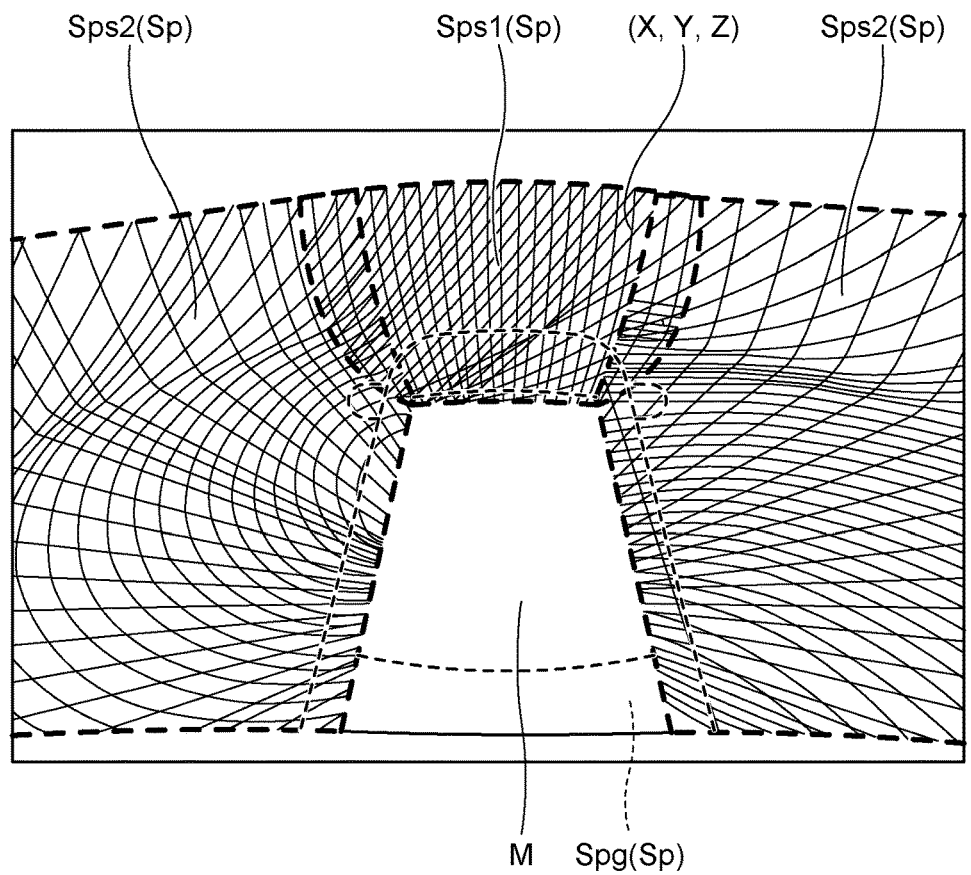
FIG. 6 is an exemplary and schematic explanatory view of the virtual projection plane (three-dimensional virtual model) in the display control apparatus according to one embodiment.
Figure 7:
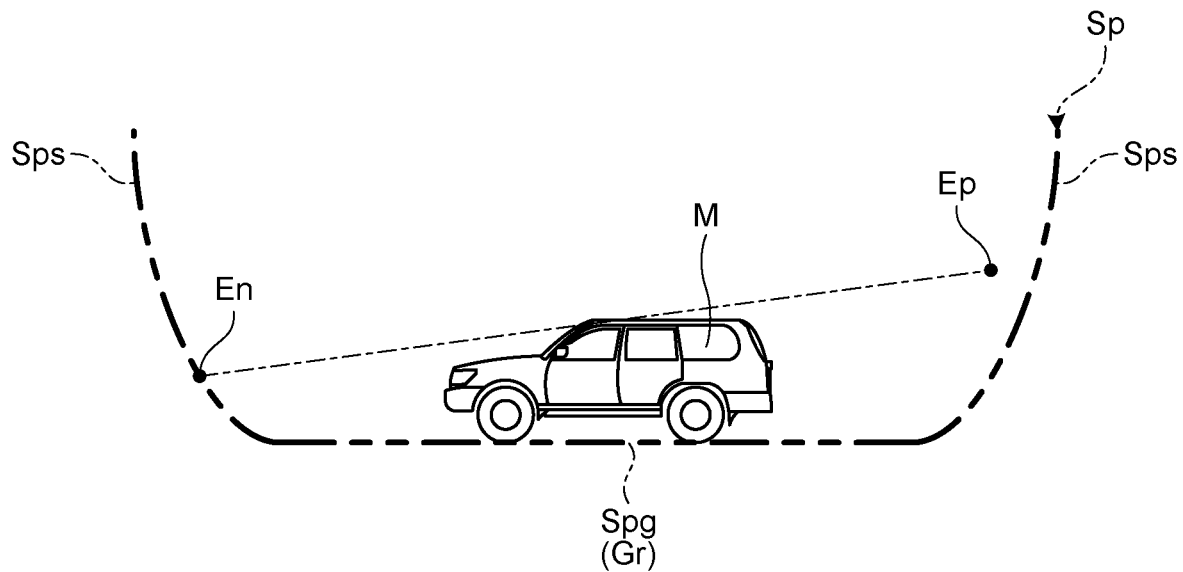
FIG. 7 is a schematic and exemplary side view of the virtual projection plane and the vehicle shape model in the display control system according to one embodiment.

The projection plane acquisition module 28 acquires a three-dimensional shape model that is stored in advance in the ROM 14b, the SSD 14f, or the like. The three-dimensional shape model is, for example, data that defines a virtual projection plane that surrounds the periphery of the vehicle 1. FIG. 5 to FIG. 7 illustrate an example of the three-dimensional shape model. FIG. 5 is a schematic view illustrating one example of projecting a photograph image Ic obtained by the image capture unit 15d to a virtual projection plane Sp (Sps). FIG. 6 is a schematic view illustrating a structure of the virtual projection plane Sp. FIG. 7 is a schematic view illustrating the entire virtual projection plane Sp.

As illustrated in FIG. 6, the virtual projection plane Sp being the three-dimensional shape model is formed of the data with a mesh structure in which coordinates (X, Y, Z) are defined, and data of each pixel of the image data captured by the image capture units 15 is projected to a point of intersection (defined by the coordinates X, Y, Z) in the mesh. Note that the mesh on the virtual projection plane Sp in FIG. 6 is illustrated for the explanation, and in reality, such mesh is set to be invisible.

The virtual projection plane Sp includes, for example, a bottom surface Spg extended along a ground Gr and a side surface Sps that rises from the bottom surface Spg, that is, the ground Gr, as illustrated in FIG. 5 and FIG. 7. The ground Gr is a horizontal surface that is orthogonal to a height direction Y (up-down direction) of the vehicle 1 and is a contact surface where the wheel 3 is in contact with. The bottom surface Spg is, for example, an approximately circular flat surface, and is a horizontal surface with respect to the vehicle 1. The side surface Sps is a curved surface that is in contact with the bottom surface Spg and rises in the height direction from part of the bottom surface Spg so as to surround the part of the bottom surface Spg. As illustrated in FIG. 5, the shape of the side surface Sps along the virtual cross section perpendicular to the vehicle 1 passing a center Gc of the vehicle 1 is, for example, elliptical or parabolic. The side surface Sps is formed as a surface of revolution around a center line CL that is extended in the height direction of the vehicle 1 and passes the center Gc of the vehicle 1. In short, the side surface Sps surrounds the vehicle 1.

The correction module 30 corrects, in the height direction, either the first captured image data representing the first image or the second captured image data representing the second image. If the first captured image data from the image capture unit 15c mounted at the first height position (first height H1) and the second captured image data from the image capture unit 15d mounted at the second height position (second height H2) are directly projected to the virtual projection plane Sp of the three-dimensional shape model, the display content in the height direction may deviate because of the difference between the first height position (first height H1) and the second height position (second height H2). In order to reduce such deviation of the display contents, the correction module 30 corrects, in the height direction, one of the first captured image data and the second captured image data to be projected to the virtual projection plane Sp (for instance, the first captured image data is corrected). The lens in the image capture unit 15 may be a wide-angle lens or a fisheye lens in order to implement the image capture in the wide range, and may contain a distortion in the image. In this case, the correction module 30 may correct the first captured image data and the second captured image data on the basis of the distortion of the lens. Detailed processing of the correction in the height direction will be described later.

The image composition module 32 joins first captured image data acquired by the image acquisition module 26 after captured by the image capture unit 15 and second captured image data acquired by the image acquisition module 26 after captured by the image capture units 15b and 15d, by performing image composition on border portions of those images, thereby generating one captured image data. The first captured image data to be joined has been corrected by the correction module 30 after acquired by the image acquisition module 26. Here, if directly joining border portions of the first and second captured image data when performing image composition, a border line may clearly appear between them. For example, the first image captured by the image capture unit 15c and the second image captured by the image capture unit 15d may be different in brightness or tone of color of the image depending on the sunlight or other lights given to those images. In this case, the border line caused by the difference in brightness or tone of color may appear, so that the quality of the composite image data may deteriorate. Considering such problem, an overlapping area is provided on the virtual projection plane Sp. The overlapping area is an area where a horizontal end part of a side surface Sps1 to which the first captured image data is projected is overlapped with a horizontal end part of a side surface Sps2 to which the second captured image data is projected. In the overlapping area, the image composition module 32 may perform blending processing for carrying out image composition on the images by using a % of each of the first and second captured image data. By performing the blending processing, the first image of the first captured image data and the second image of the second captured image data are joined while the images are gradually changed, so that the border line that may appear depending on the difference in brightness or tone of color can be made less visible.

In a case where a peripheral image representing the circumstance behind the vehicle 1 is displayed by the ECU 14, the image composition module 32 similarly performs image composition on the first captured image data captured by the image capture unit 15a and the second captured image data captured by the image capture unit 15d and the image capture unit 15b, thereby generating one captured image data.

The three-dimensional processing module 34 generates the data of the virtual projection image. The virtual projection image is obtained by projecting the captured image data, on which the image composition has been performed by the image composition module 32, to the virtual projection plane Sp (three-dimensional shape model) surrounding the vehicle 1 that is defined based on the position where the vehicle 1 exists. As illustrated in FIG. 5, the three-dimensional processing module 34 calculates a virtual projection image Ip obtained by projecting the photograph image Ic to the virtual projection plane Sp. When the captured image Ic is projected to the ground Gr, a projected image extends longer as being separated away from the image capture unit 15, and thereby the projected image may be displayed longer than the actual one in the output image. As is understood from FIG. 5, the virtual projection image Ip projected to the side surface Sps that rises from the ground Gr (bottom surface Spg) is shorter than that in the case where the image is projected to the ground Gr. Thus, the virtual projection image Ip is prevented from being displayed to be longer than the actual one in the output image.

As illustrated in FIG. 6 and FIG. 7, the three-dimensional processing module 34 disposes a vehicle shape model M corresponding to the vehicle 1, which has been stored in the ROM 14b, the SSD 14f, or the like, within the three-dimensional virtual space including the virtual projection plane Sp. The three-dimensional processing module 34 sets a predetermined transmissivity for the vehicle shape model M that is disposed on the three-dimensional virtual space. Thus, in the three-dimensional virtual space, the virtual projection image Ip on the opposite side can be seen over the vehicle shape model M.

The peripheral image generation module 36 generates the peripheral image data. In this peripheral image data, the vehicle shape model M and the virtual projection image Ip, which are formed by projecting the captured image data to the virtual projection plane Sp in the three-dimensional virtual space where the captured image is projected, are seen from a viewpoint Ep set in the three-dimensional virtual space to a fixation point En. The peripheral image generation module 36 supplies the generated peripheral image data to the display control unit 14d. The display control unit 14d causes the display device 8 to display the three-dimensional peripheral image.

FIG. 7 is a schematic view illustrating the entire virtual projection plane Sp in which the vehicle shape model M is used as the center. The peripheral image generation module 36 converts the virtual projection image Ip projected to the virtual projection plane Sp (see FIG. 5) into peripheral image data (not illustrated in FIG. 6) that is seen from the virtual viewpoint Ep. In the example illustrated in FIG. 7, the viewpoint Ep is set behind the vehicle shape model M and sees ahead of the vehicle shape model M (a fixation point En).

According to the present embodiment, the display control system 100 performs the image composition on pieces of image data captured by the image capture units 15 mounted to the vehicle 1 and displays, in the three-dimensional virtual space, the circumstance around the vehicle 1 seen from the arbitrary viewpoint Ep to the fixation point En. Thus, it is possible for the user (driver, for example) to easily recognize the circumstance around the vehicle 1.

Upon detection of the object around the vehicle 1, such as another vehicle, wall, or pedestrian, by the distance measuring units 16 or the distance measuring units 17, the object position acquisition module 38 acquires the position of the object, for example, the distance to the object. The variable setting module 40 is able to set the position of the side surface Sps of the virtual projection plane Sp, which is defined by the three-dimensional shape model acquired by the projection plane acquisition module 28, in accordance with the position of the object acquired by the object position acquisition module 38. Plural virtual projection planes Sp in which the bottom surfaces Spg have different sizes (virtual projection planes Sp whose side surfaces Sps rise from different positions of the vehicle shape model M) are stored in the ROM 14b or the SSD 14f. Then, when the projection plane acquisition module 28 acquires the three-dimensional shape model, the variable setting module 40 may select the three-dimensional shape model that defines the virtual projection plane Sp including the side surface Sps that rises from the position corresponding to (close to) the position of the object. In another example, based on a position of the object acquired by the object position acquisition module 38, the variable setting module 40 may calculate the three-dimensional shape model that defines the virtual projection plane Sp including the side surface Sps that rises from the acquired position of the object, and may provide the calculated model to the projection plane acquisition module 28.

Figure 8:
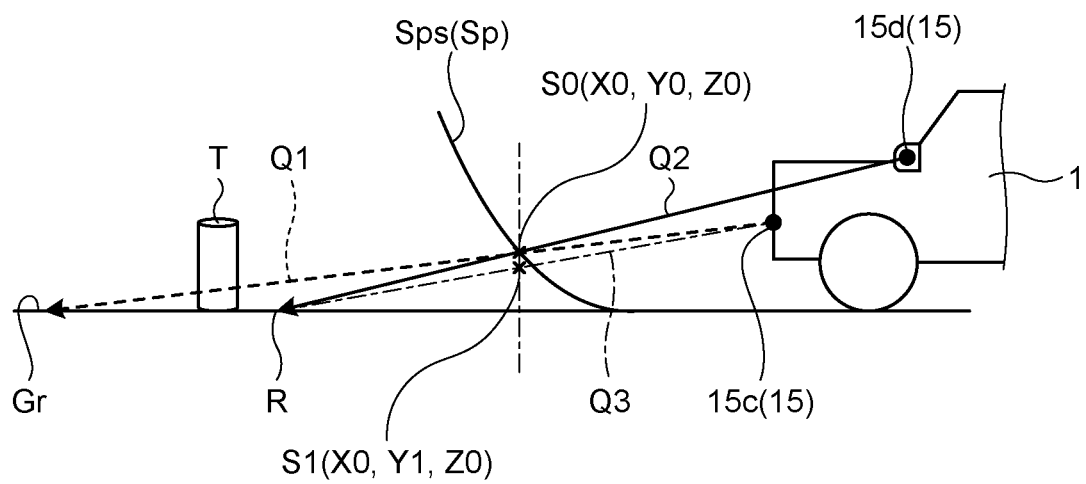
FIG. 8 is a schematic and exemplary explanatory view for describing occurrence of display deviation in a height direction of a three-dimensional composite image caused depending on height positions of image capture units in the display control apparatus according to one embodiment, and the correction of the display deviation.

FIG. 8 is a diagram for explaining the changing of the projection position of the captured image data for the side surface Sps of the virtual projection plane Sp by the correction performed by the correction module 30. The deviation of the display content of the three-dimensional peripheral image (peripheral image data) generated by the peripheral image generation module 36 is reduced. Specifically, the deviation in the height direction between the first image representing the image in front of the vehicle 1 and the second image representing the image beside the vehicle 1 is reduced.

In FIG. 8, an explanatory view is illustrated, in which the first image based on the first captured image data captured by the image capture unit 15c corresponding to the first image capture unit and the second image based on the second captured image data captured by the image capture unit 15d corresponding to the second image capture unit are projected to the side surface Sps of the virtual projection plane Sp. Note that FIG. 8 illustrates a case where the correction by the correction module 30 is not performed and the deviation of the image content occurs in the height direction in FIG. 9, and also a case where the deviation of the image content in the height direction is reduced because of the correction by the correction module 30 in FIG. 10.

Figure 9:
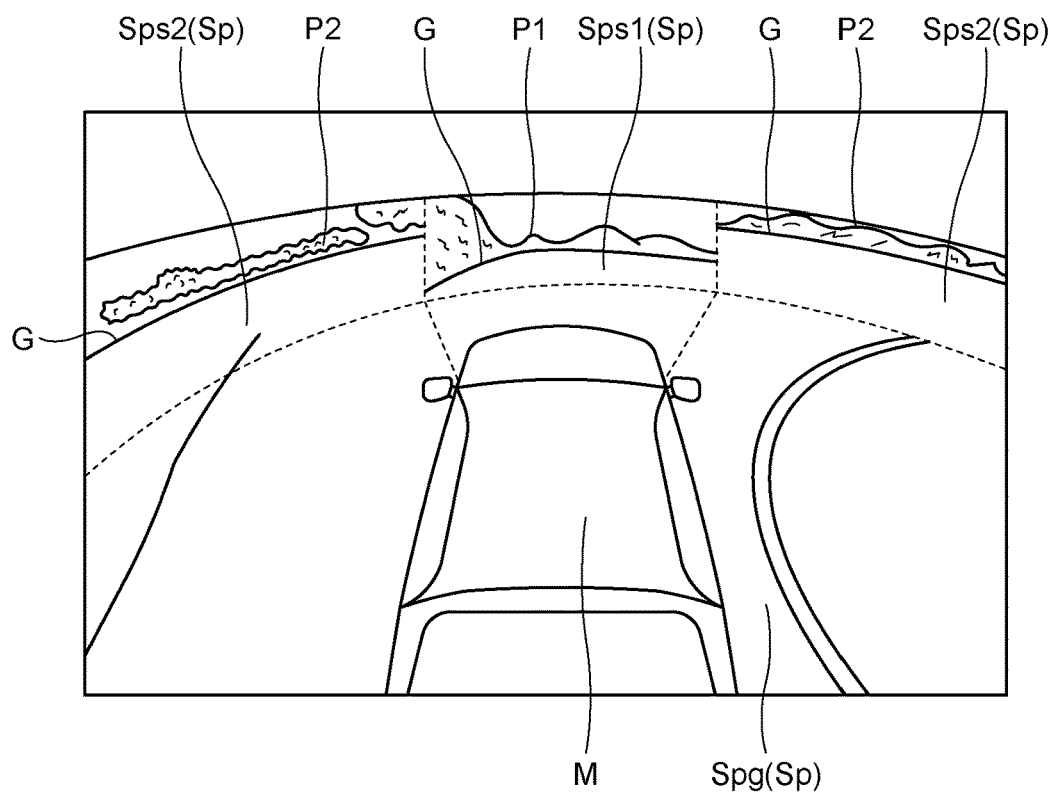
FIG. 9 is a diagram illustrating a display example of a schematic three-dimensional composite image for describing occurrence of the display deviation in the height direction of the three-dimensional composite image caused depending on the height positions of the image capture units.

First, the case in which the correction by the correction module 30 is not performed is described. When an object T exists at a position different from the position of the side surface Sps of the virtual projection plane Sp (for example, the object T exists at the position further ahead of the side surface Sps), the object that exists on an extension line Q1 of the image capture unit 15c (first image capture unit) is reflected (projected) at a point S0 (X0, Y0, Z0) on the side surface Sps of the virtual projection plane Sp. In this case, the object T is reflected (included) in the first captured image data captured by the image capture unit 15c for the point S0 on the side surface Sps. On the other hand, the object T does not exist on an extension line Q2 of the image capture unit 15d (second image capture unit), so that the object T is not reflected (included) even when the second captured image data captured by the image capture unit 15d is projected to the point S0 on the side surface Sps. In this case, the object T is reflected at a position a little above the point S0 at the side surface Sps. In this manner, in the case where the parts reflected on the extension lines of the image capture unit 15c (first image capture unit) and the image capture unit 15d (second image capture unit) are different, the projection positions of the object T deviates in the height direction when the first image captured by the image capture unit 15c and the second image captured by the image capture unit 15d are configured on the side surface Sps of the virtual projection plane Sp. As a result, for example, as illustrated in FIG. 9, the horizontal line G of the first image P1 captured by the image capture unit 15c (first image capture unit) projected on the side surface Sps1 of the virtual projection plane Sp and the horizontal line G of the second image P2 captured by the image capture unit 15d (second image capture unit) projected on the side surface Sps2 of the virtual projection plane Sp deviate in the height direction. If it is attempted to make the horizontal line G of the first image P1 coincide with the horizontal line G of the second image P2 by changing the shape of the three-dimensional shape model, the unevenness occurs at an upper end part of the three-dimensional shape model and the shape of the outer edge and the like of the displayed peripheral image also causes visual unnaturalness. In addition, the deviation is generated at a connection part between the side surface Sps and the bottom surface Spg of the virtual projection plane Sp, and another visual unnaturalness is caused in the three-dimensional peripheral image.

The deviation between the horizontal line G of the first image P1 and the horizontal line G of the second image P2 described above is caused mainly by the difference in height between the image capture units 15. In view of this, the projection position of at least one of the first image P1 and the second image P2 to be projected to the virtual projection plane Sp is corrected by the correction module 30 on the basis of the difference in height position between the image capture units 15. Specifically, based on the height ratio (see FIG. 5) between the first height position (first height H1) of the image capture unit 15c (first image capture unit) and the second height position (second height H2) of the image capture unit 15d (second image capture unit), the projection position of at least one of the first image P1 and the second image P2 to be projected to the virtual projection plane Sp is corrected so that the content of the first image P1 and the content of the second image P2 are aligned in the height direction. In this case, the relation of the two-dimensional coordinate (U, V) of the first image P1 for the three-dimensional coordinate (X0, Y0, Z0) of the point S0 on the side surface Sps of the virtual projection plane Sp that is defined by the three-dimensional shape model is calculated. That is, the correction module 30 calculates a three-dimensional coordinate (X0, Y1, Z0) of the point S1 including the height component Y1, in which only the height component Y0 of the three-dimensional coordinate (X0, Y0, Z0) of the point S0 is corrected in accordance with the following "Expression 1". Then, the two-dimensional coordinate (U, V) of the first image P1 for the point S1 is projected to the three-dimensional coordinate (X0, Y0, Z0) of the point S0.

$$Y1 = Y0 \times (\text{first height } H1)/(\text{second height } H2) \quad \text{(Expression 1)}$$

Figure 10:
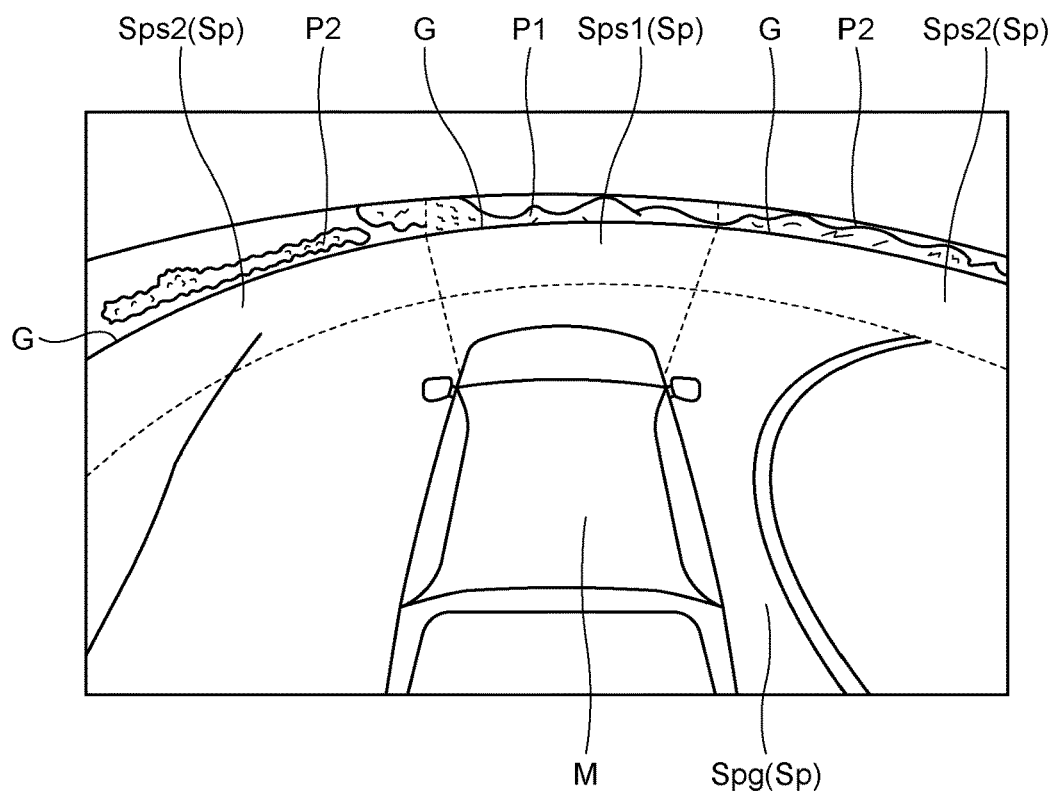
FIG. 10 is a diagram illustrating a display example of a schematic three-dimensional composite image in the case where the display deviation in the height direction of the three-dimensional composite image caused depending on the height positions of the image capture units is solved by the correction by the display control apparatus according to one embodiment.

In the case of FIG. 8, the image capture unit 15c (first image capture unit) that photographs a region ahead of the vehicle 1 is fixed at a position lower than the image capture unit 15d (second image capture unit) that photographs the side region of the vehicle 1. Therefore, the three-dimensional coordinate (X0, Y1, Z0) of the point S1 after the correction is at the position lower than the three-dimensional coordinate (X0, Y0, Z0) of the point S0 before the correction. As illustrated in FIG. 8, the object existing on an extension line Q3 of the image capture unit 15c (first image capture unit) passing the three-dimensional coordinate (X0, Y1, Z0) of the point S1 becomes closer than the object existing on the extension line Q2 of the image capture unit 15c (first image capture unit) passing the three-dimensional coordinate (X0, Y0, Z0) of the point S0 in accordance with the height ratio between the first height position (first height H1) and the second height position (second height H2). That is, the intersection between the ground Gr and the extension line Q2 of the image capture unit 15d (second image capture unit) and the intersection between the ground Gr and the extension line Q3 of the image capture unit 15c (first image capture unit) are present at substantially the same position R. Therefore, by projecting the two-dimensional coordinate (U, V) of the first image P1 for the three-dimensional coordinate (X0, Y1, Z0) of the point S1 after the correction to the position of the three-dimensional coordinate (X0, Y0, Z0) of the point S0, the image composition module 32 projects the image at a closer position to the side surface Sps of the virtual projection plane Sp. Thus, the projection position of the first image P1 is corrected upward in accordance with the height ratio between the first height position (first height H1) and the second height position (second height H2) on the side surface Sps, and the content of the first image P1 and the content of the second image P2 are aligned in the height direction. Therefore, the image composition module 32 is able to generate one captured image data in which the first image P1 and the second image P2 are joined at their border portions in the state where contents of the first image P1 and the second image P2 are almost aligned. As a result, as illustrated in FIG. 10, the horizontal line G of the first image P1, which has been captured by the image capture unit 15c (first image capture unit) and projected to the side surface Sps1 of the virtual projection plane Sp, and the horizontal lines G of the second images P2, which has been captured by the image capture unit 15d and the image capture unit 15b (second image capture units) and projected to the side surfaces Sps2 of the virtual projection planes Sp, substantially coincide with each other. Therefore, it is possible to display the three-dimensional peripheral image with less discomfort.

Note that the door mirrors 2g on the left and right sides of the vehicle 1 are usually placed at different angles because their distances from the driver's seat are different. As a result, the image capture unit 15b and the image capture unit 15d fixed to the left and right door mirrors 2g are different in the height position (height from ground). Therefore, the second height position (second height H2) in the case of calculating the height component Y1 may be the average value of the second height positions (second heights H2) of the image capture unit 15b and the image capture unit 15d. In this case, the display deviation of the first image P1 with respect to the second images P2 that are joined to the first image P1 at the left and right sides can be reasonably reduced.

Note that, for example, the three-dimensional coordinate (X0, Y1, Z0) of the point S1 may be calculated by the correction module 30 by obtaining the height position of each image capture unit 15 from various pieces of data saved in the ROM 14b or the like when the power of the vehicle 1 is turned on, for example, the ignition switch is turned on. The results of the calculation are saved in the ROM 14b or the SSD 14f. Then, every time the image acquisition module 26 acquires the captured image data from the image capture unit 15 (in every frame drawing), the image composition module 32 performs the image composition on the first image P1 and the second image P2 that have been corrected in the height direction along the border part to generate one captured image data. The three-dimensional processing module 34 and the peripheral image generation module 36 generate the peripheral image as illustrated in FIG. 10 by using the captured image data in which the height alignment has been performed on the basis of the setting state of the viewpoint Ep and the fixation point En.

In the example illustrated in FIG. 10, the drawing position of the first image P1 captured by the image capture unit 15c (first image capture unit) is corrected upward in accordance with the height ratio between the first height position (first height H1) and the second height position (second height H2). In another embodiment, the drawing positions of the second images P2 captured by the image capture unit 15b and the image capture unit 15d (the second image capture units) may be corrected downward in accordance with the height ratio between the first height position (first height H1) and the second height positions (second heights H2). As a result, in a manner similar to the above example, the content of the first image P1 and the content of the second image P2 can be aligned in the height direction, and it is possible to display the peripheral image in which contents of the first image P1 and the second image P2 are joined at their border portions without visual unnaturalness.

According to the display control system 100 described in the present embodiment, the shape of the virtual projection plane Sp is not changed, so that the shape of the outer edge part and the like of the displayed three-dimensional composite image is not changed. Therefore, the display deviation of the image content in the height direction can be reduced without a deterioration in merchantability of the display image. Note that the correction module 30 corrects the height component Y1 on the side surface Sps of the virtual projection plane Sp not in accordance with a uniform manner such as "Y1=Y−α" but in accordance with the height ratio between the first height position (first height H1) and the second height position (second height H2). As a result, the deviation at the border part between the side surface Sps and the bottom surface Spg of the virtual projection plane Sp does not occur. Therefore, the display without visual unnaturalness as the entire virtual projection plane Sp can be realized.

Figure 11:
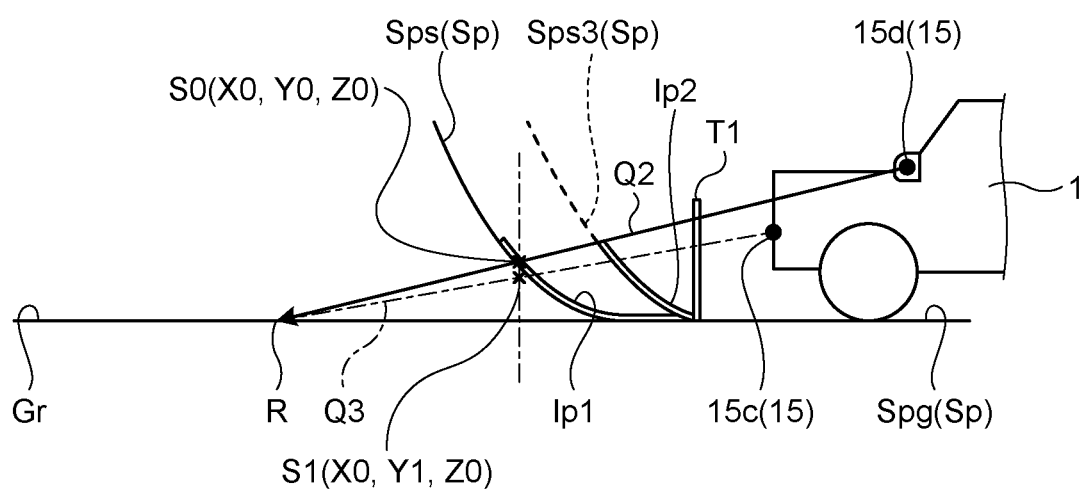
FIG. 11 is a schematic and exemplary side view in which a side surface of the virtual projection plane is set at an object detection position in the display control apparatus according to one embodiment.

Meanwhile, even in the case where the display deviation in the height direction on the side surface Sps of the virtual projection plane Sp is reduced as described above, if the rising position of the side surface Sps from the bottom surface Spg of the virtual projection plane Sp is fixed, visual unnaturalness may arise in the display content. For example, as illustrated in FIG. 11, in a case where an object T1 exists at the position closer to the vehicle 1 than to the side surface Sps, when the object T1 is projected to the virtual projection plane Sp, the object T1 is displayed over the bottom surface Spg and the side surface Sps. As a result, a virtual projection image Ip1, which is larger (longer) than the actual object T1, is displayed, and the display device 8 (see FIG. 3) may display the object as if it has been larger than the actual object T1.

In view of the above problem, when an object around the vehicle 1 is detected by the distance measuring units 16 and/or the distance measuring units 17 (see FIG. 3), the object position acquisition module 38 acquires the position of the object, for example, the distance to the object T1. Then, the variable setting module 40 sets the projection plane acquisition module 28 to acquire the virtual projection plane Sp where a side surface Sps3 rises from the position of the object T1 acquired by the object position acquisition module 38. As described above, in the case where more than one virtual projection planes Sp including the bottom surfaces Spg with different sizes (virtual projection planes Sp whose side surfaces Sps rise from different positions of the vehicle shape model M) are stored in the ROM 14b or the SSD 14f, the variable setting module 40 transmits control signals so that the projection plane acquisition module 28 reads out the virtual projection plane Sp that suits the distance to the object T1. In addition, the variable setting module 40 may calculate, in accordance with the position of the object T1 acquired by the object position acquisition module 38, the three-dimensional shape model that defines the virtual projection plane Sp including the side surface Sps3 that rises from the position of the object T1, and then provide the calculated model to the projection plane acquisition module 28. In this case, the object T1 is projected to the side surface Sps3 and is not projected substantially to the bottom surface Spg; therefore, a virtual projection image Ip2 whose size (height) is more like the actual one can be displayed in the three-dimensional virtual space. The two-dimensional coordinate (U, V) of the first image P1 for the three-dimensional coordinate (X0, Y1, Z0) of the point S1 after the correction is projected to the position of the three-dimensional coordinate (X0, Y0, Z0) of the point S0 so that the intersection between the ground Gr and the extension line Q2 of the image capture unit 15d (second image capture unit) and the intersection between the ground Gr and the extension line Q3 of the image capture unit 15c (first image capture unit) are present at substantially the same position R. As a result, the three-dimensional peripheral image by which the size of the actual object T1 can be recognized more easily and in which the display deviation in the height direction is reduced and the visual unnaturalness is reduced more can be displayed. In short, the peripheral image with higher image quality can be displayed.

Note that, when the object T1 is detected by the distance measuring units 16 and/or 17, the ECU 14 may announce the existence of the object T1 through the display device 8 or the sound output device 9. In addition, an announcement may be performed as to an event that the side surface Sps of the virtual projection plane Sp is set at the position of the object T1. The object T1 may be detected by image recognition instead of the use of the distance measuring units 16 or 17. For example, by providing the vehicle 1 with a stereo camera as the image capture unit 15, it is possible to detect the distance to the object T1 by means of the known image processing.

In the foregoing embodiment, the three-dimensional peripheral image that views the region ahead of the vehicle 1 is displayed. The display control system 100 is able to change the position of the viewpoint Ep by the operation of the operation input unit 10, for example. The display control system 100 is also able to perform the three-dimensional overhead display, in which an image is displayed downward from the higher viewpoint Ep, or the display of the three-dimensional peripheral image that views a horizontal from the lower viewpoint Ep. Similarly, the three-dimensional peripheral image viewing the region behind the vehicle 1 can be displayed by setting the viewpoint Ep in front of the vehicle 1 and setting the fixation point En behind the vehicle 1. In this case, the effect, which is similar to the effect obtained in the foregoing case where the region in front of the vehicle 1 is displayed, can be achieved by using an image captured by the image capture unit 15a as the first image P1 and using the images captured by the image capture unit 15b and the image capture unit 15d as the second image P2.

In the aforementioned example, every time the ignition switch is turned on, the correction module 30 calculates the height ratio based on the height position of each image capture unit 15 and calculates the three-dimensional coordinate (X0, Y1, Z0) of the point S1 used for correcting the projection position of the first image. The height position of each image capture unit 15 is fixed by a factory or dealers of vehicles and, after that, is usually unchanged except when the image capture unit 15 is repaired or exchanged. In view of this fact, the factory or dealers of the vehicles may, in advance, calculate the three-dimensional coordinate (X0, Y1, Z0) of the point S1 used for correcting the projection position of the first image by using the height ratio based on the height position of each image capture unit 15, and save data of the corresponding two-dimensional coordinate (U, V) in the ROM 14b or the SSD 14f. In this case, the processing burden on the ECU 14 can be reduced and the ECU 14 with the relatively low performance can also be used. Thus, the selection range when selecting the ECU 14 becomes wider and the ECU 14 that costs less can also be used, which is advantageous.

In the above embodiment, the virtual projection plane Sp is formed by the bottom surface Spg and the side surface Sps. In another embodiment, the virtual projection plane Sp may be formed by the side surface Sps alone. That is, the image displayed on the display device 8 only includes a rising surface at a position a predetermined distance apart from the vehicle 1 is displayed. In this case, the correction module 30 may correct the content (projection position) of the image to be projected to the side surface Sps (virtual projection plane Sp) by using the difference (gap) between the first height position (first height H1) of the first image capture unit (for example, image capture unit 15c) and the second height position (second height H2) of the second image capture unit (for example, image capture units 15b, 15d). Also in this case, the shape of the side surface Sps (virtual projection plane Sp) remains the same. Therefore, the shape of the outer edge part of the three-dimensional composite image to be displayed does not change, and the display deviation of the image content in the height direction can be reduced without deterioration in merchantability of the display image.

Some embodiments of the present invention have been described; however, these embodiments are merely examples and do not intend to limit the range of the invention. These novel embodiments can be carried out in other various modes and various omissions, replacements, and changes are possible within the range not departing from the scope of the invention. These embodiments and modifications thereof are included in the range and concept of the invention and in the invention according to the scope of claims and the equivalent range thereof.

What is claimed is:

1. A display control apparatus comprising:
   a memory; and
   a hardware processor coupled to the memory and configured to:
   acquire a first image and a second image, the first image being obtained from a first image capture device that is mounted at a first height position of a vehicle to capture an image of a circumstance in a first direction of a periphery of the vehicle, the second image being obtained from a second image capture device that is mounted at a second height position differing from the first height position to capture an image of a circumstance in a second direction differing from the first direction;
   acquire a three-dimensional virtual projection plane to which the first image and the second image are projectable, the three-dimensional virtual projection plane including at least a side surface that rises in a height direction from a ground contact surface of the vehicle;
   correct, in the height direction, a projection position of at least one of the first image and the second image to be projected to the virtual projection plane on a basis of a difference between the first height position and the second height position, the correction of the projection position being performed to align content of the first image and content of the second image with each other; and
   generate a three-dimensional composite image including the first image and the second image that have been aligned with each other in the height direction by the correction.

2. The display control apparatus according to claim 1, wherein the hardware processor performs the correction of the projection position on a basis of a height ratio between the first height position and the second height position.

3. The display control apparatus according to claim 1, further comprising a position detection unit device configured to be capable of detecting a position of an object existing around the vehicle,
   wherein the hardware processor acquires the virtual projection plane including the side surface that is provided at a position corresponding to the position of the object.

* * * * *